United States Patent Office 2,986,861
Patented June 6, 1961

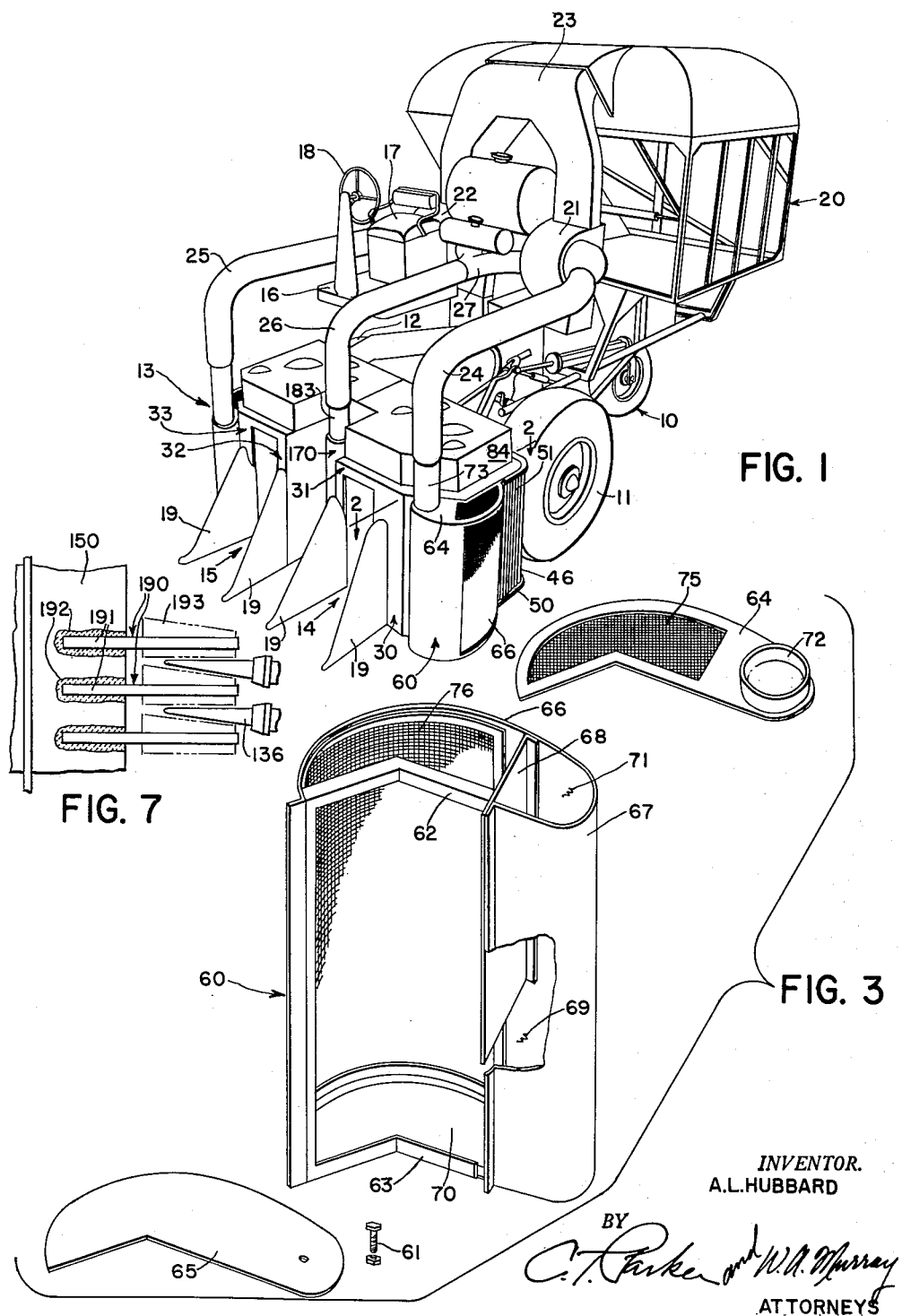

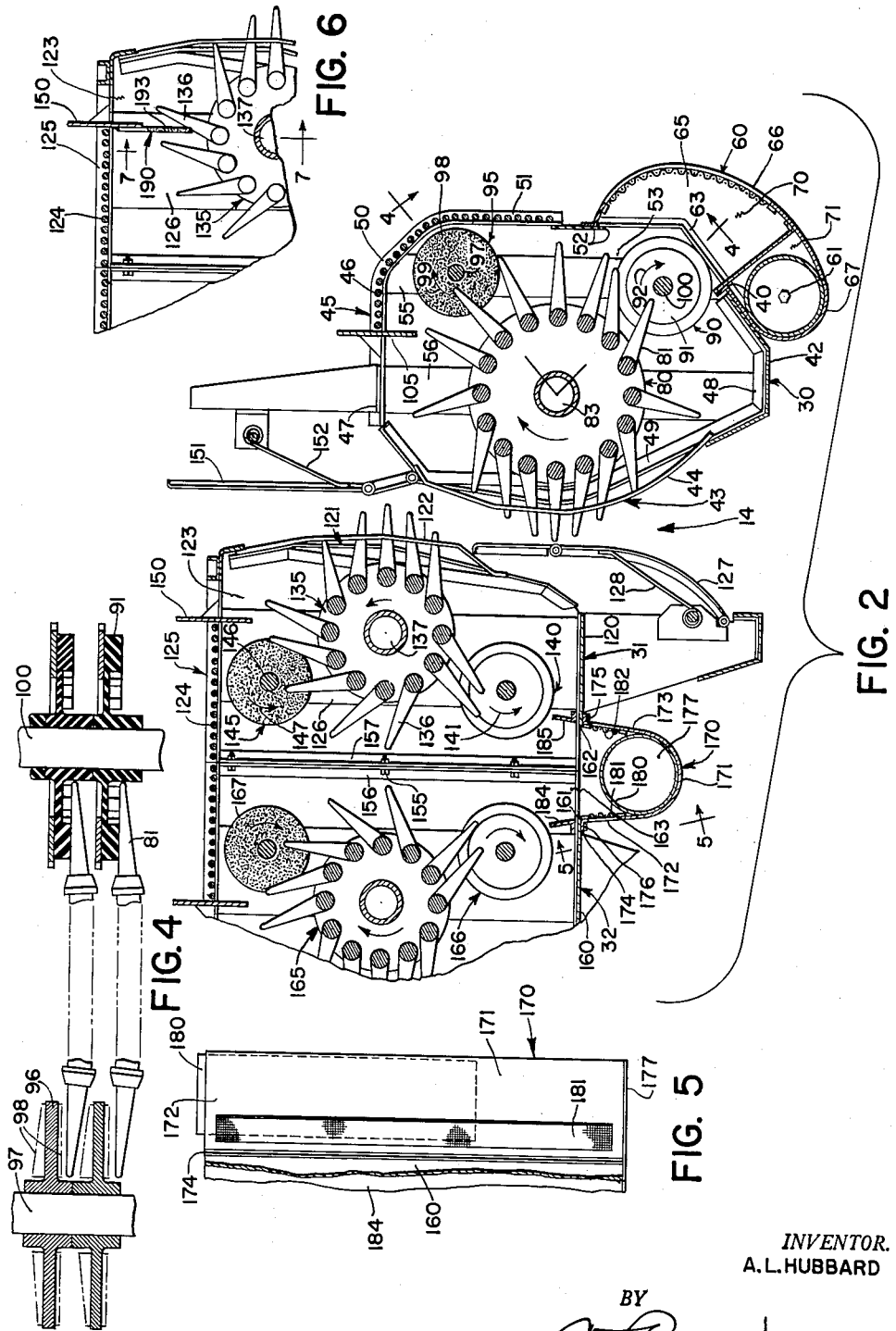

2,986,861
COTTON PICKING UNIT

Arthur L. Hubbard, Des Moines, Iowa, assignor to Deere and Company, Moline, Ill., a corporation of Delaware Filed Aug. 5, 1959, Ser. No. 831,842
19 Claims. (Cl. 56—41)

This invention relates to a cotton harvester of the type in which an upright spindle drum operates to move spindles through a cotton plant for purposes of detaching the bolls from the plant and to then move the spindles inwardly of the picker housing where a doffing mechanism operates to remove the bolls from the spindles and feed them into suction ducts. More particularly this invention relates to repositioning the doffing mechanism in improved housing means and providing cleaning mechanism within the housing which improves the quality of the cotton.

In U.S. Patent 2,904,948 issued to A. L. Hubbard September 22, 1959, there is disclosed an improved picker housing which features grille structure to the rear of the doffing mechanism, the doffing mechanism being of conventional form and positioned rearwardly of the picking drum. Further disclosed is the feature of mounting a door structure outwardly of the doffing mechanism, the panels of the door structure being composed of perforated sheets whereby the air required for the suction in the forward part of the door is received directly from the atmosphere and not from within the picker housing. It has been determined that by opening the picker housing and door structure to the atmosphere so as to eliminate any fluxuations of air pressures and air currents in the picker housing and also by providing an open housing so as to permit trash to leave the picker housing, the quality of cotton is considerably improved.

It is proposed and it is one of the main objects of the present invention to further improve the structure as set forth in the aforesaid application by mounting the doffing mechanism forwardly of the spindle drum whereby the spindles moving in an orbit about the axis of the spindle drum will move well through half the orbit prior to the cotton being doffed from the spindles. This will give the trash which is picked with the cotton a greater opportunity to be dislodged from the cotton prior to the cotton being doffed. It is further proposed, in combination with this improvement, to extend the grille or perforated wall structure, forming the rear and side walls of the picker housing, around the entire width and length respectively of the wall structures so as to permit trash leaving the spindles adequate opportunity to move outwardly of the housing.

It is a further object of this invention to incorporate with the above improvement a picker door positioned adjacent to the doffing mechanism which receives the doffed cotton and moves it forwardly and inwardly relative to the picking unit and discharges it into the suction duct at the forward portion of the picker housing. The door structure will be formed primarily by an outer arcuate-shaped upright panel closed at its upper and lower end by horizontal panels. The door structure will be composed of two compartments, the panels forming one compartment at the side of the doffer being perforate and the panels forming a second adjoining compartment forward of the picker housing being imperforate. A panel will separate the front and side compartments and will permit communication between the compartments through an opening at the lower end of the dividing panel which is common to both compartments.

It is still a further object of the present invention to incorporate in the aforedescribed type of picker housing and door structure brush means composed of a plurality of vertically spaced brush elements which extend between the various rows of spindles and operates to comb the trash from the cotton as the spindles move past the brushes. The brushes will be placed in the picker housing so as to clean the cotton prior to its being contacted by the doffing mechanism.

It is still a further object of the present invention to incorporate for use with a two-row cotton picker having outer picking units on outer sides of the pair of rows and a pair of adjacent inner picking units on the inner side of the pair of rows. The doffing mechanism in the inner picking units will be positioned forwardly of the spindle drums and will feed into a common discharge duct at the forward end of the inner picking units.

Other objects and advantages of the present invention will become apparent to those skilled in the art as the nature of the invention is better understood following a full appreciation of the invention as set forth in the following specification and as shown in the accompanying drawings.

FIG. 1 is a front and left perspective view of a two-row cotton picker incorporating the features of this invention.

FIG. 2 is an enlarged sectional plan view of the picking mechanism with part of the picking mechanism being shown in representative form and taken substantially along the line 2—2 of FIG. 1.

FIG. 3 is an exploded view of the door on the outer side of the picking unit.

FIG. 4 is a sectional view taken substantially along the line 4—4 of FIG. 2.

FIG. 5 is a sectional view taken substantially along the line 5—5 of FIG. 2.

FIG. 6 is a sectional plan view similar to a portion of FIG. 2 showing a modification of the invention.

FIG. 7 is a sectional view taken substantially along the line 7—7 of FIG. 6.

The picking machine chosen for purposes of illustration comprises a supporting frame or body 10 which is conventionally a tractor operated in reverse to advance a cotton harvester over the field. The tractor includes transversely spaced rear traction wheels 11, 12. The tractor 10 carries forwardly thereof a picking mechanism housing structure, indicated in its entirety by the reference numeral 13, the housing structure 13 forming a pair of fore-and-aft extending picking passageways or throats 14, 15 extending lengthwise of the housing 13 and positioned to receive adjacent rows of cotton plants. The supporting structure between the tractor 10 and housing 13 is also of conventional design and is of no importance relative to the present invention. However, a preferred arrangement for mounting the harvester on the tractor 10 is shown and described in detail in U.S. Patent 2,719,394, issued to Fred A. Thomann and Robert H. Meier, October 4, 1955.

The body or tractor 10 carries a forwardly positioned operator's platform 16 on which is supported a seat 17 and a steering wheel 18 for guiding the machine. Cotton plants are guided into the throat or passageways 14, 15 by dividers or plant lifters 19. Also supported on the tractor 10 is a large basket or container 20. A pair of blowers 21, 22 provides air for a central bifurcated duct system 23 directed into the basket 20. Feeding into the blowers 21, 22 are a pair of outer suction ducts 24, 25 receiving cottom from picking units on the outer sides of the rows of plants and a central duct 26 which receives cotton from the pair of adjacent picking units on the inner side of the rows of plants. The central duct 26 has a bifurcated rear end 27 with legs of the end 27 feeding into blowers 21, 22. Other than the duct systems 24, 25, 26, and 27 the picker, up to this point, is more or less of conventional design and such has been described only for purposes of orientation.

The harvesting mechanism is composed of four picking units shown from left to right in FIG. 1 at 30, 31, 32, and 33. The picking units 30, 31 operate to pick cotton from the plants in the left row of the pair of rows and the picking units 32, 33 operate to pick cotton from the right row of the pair of rows. Generally the picking units 30, 31 are identical to the picking units 33, 32 respectively and consequently detailed description of the picking units will be limited to the former. Description of the picking units 32, 33 will be given only to the extent necessary for a full appreciation of the present invention.

Referring now to FIG. 2, the left outer picking unit 30 is composed of a picker housing or casing formed by front or forward upright wall structure 42 generally imperforate and extending around the front portion of the unit 30. The exact configuration in the front housing structure 42 is unimportant other than to recognize that it does enclose completely the forward end of the picking mechanism and has an outer terminal edge 40. Side or passage adjacent wall structure 43 extends from the inner end or edge of the forward housing structure 42 rearwardly. As is conventional, the housing structure 43 adjacent to the passage 14 is composed of a plurality of vertically spaced horizontal grid bars 44 which form between them vertically spaced fore-and-aft extending openings through which the spindles on the picking drum may pass into the stalk passage 14. At the rear of the unit 41 there is provided rear upright wall structure 45 which is generally disposed transversely to the direction of travel of the harvesting unit. The rear housing structure is formed at its left or outer end portion by a plurality of vertically disposed and transversely spaced apart bars 46 forming a grille through which air may pass and which also will permit trash accumulated within the picker housing to be discharged. The right or inner end of the rear wall structure 45 has a large upright and elongated trash discharge opening 47 through which trash leaving the spindles may pass. All of the wall structures 41, 43, and 45 are flanged at their lower and upper ends such as at 48, 49, and 50 to provide both strength to the housing structure as well as serving as means for attaching the upright sides to the top and bottom of the housing structures. Wall structure 51 on the outer side of the picking unit is formed at its rear by a continuation of the grille bars 46 and extends forwardly to a forward plate section having a terminal edge 52, the latter edge 52 forming with the outer edge 40 of the forward wall structure 42 a boll discharge opening 53. The bottom of the housing structure comprises a pair of fore-and-aft extending plates 55, 56 fixed at their front and rear ends to the flanges 48 and 50 respectively. The plates 55, 56 are spaced transversely apart to provide a generally open bottom at the base of the picking unit 30.

The picking unit 30 is therefore enclosed generally at the front, inner side, outer side, and rear by the upright housing structures 42, 43, 45 and 51, leaving only the boll discharge opening 53 at the outer forward end of the picking unit and the trash discharge opening 47 at the rear. Provision is made for closing the boll discharge opening 53 by means of an arcuate-shaped door structure indicated in its entirety by the reference numeral 60. The door 60 is hingedly mounted for horizontal movement on a forward extension, not shown, of the support plate 55. A pivot pin 61 operates as the pivot for swinging the door 60 and also operates as the means for connecting the door on the forward extension of the support plate 55. Viewing FIGS. 1–3, it becomes apparent that the door may swing forwardly about the pivot pin 61 so that access may be made to the picking and doffing mechanism through the boll discharge opening 53.

The door structure 60 comprises upper and lower panels 64, 65 respectively having arcuate-shaped outer edges extending from the forward edge 52 of the side wall 51 arcuately around the forward outer portion of the picker housing. The inner edges of the upper and lower panels 64, 65 are formed to fit snugly against the outer edges of the picker housing. Upper and lower angle iron members 62, 63 serve as structural support at the inner edges of the panels 64, 65. The outer edges of the upper and lower panels 64, 65 are joined by an upright panel 66 arcuately formed to extend generally as a continuation from the forward terminal edge 52 to the outer terminal edge 40 of the side and front wall structures 51, 42 respectively. The arcuate-shaped upright panel 66 serves as the closure member at the outer forward corner of the picker housing. The forward and inner end of the arcuate-shaped door or panel 66 is formed into a U-shaped portion 67, one leg of which lies adjacent to the forward wall structure 42. An upright panel 68 extends downwardly from the upper panel 64 and terminates at a lower edge spacedly from the lower panel 65 forming with the lower panel 65 and walls of the U-shaped section 67 a passage 69 through which bolls may pass. The panel 68 also serves to separate the door structure 60 into an outer rear compartment and a forward inner compartment. The upper panel 64 is provided with a forward upwardly extending annular flange 72 which receives a cylindrical or duct extension 73 which in turn fits into the outer suction duct 24. The portion of the panel 64 fitting above the rear compartment 70 is perforated as at 75 for purposes of permitting a flow of air from the atmosphere into the door structure. A rear portion 76 of the outer upright panel 66 which fits outwardly of the divider panel 68 is also perforated to permit a relatively free flow of air from the atmosphere into the door structure. The exact method of fixing the panels of the door structure 60 to one another is unimportant for purposes of this invention. In practice, spot welding is used, but other types of connections such as riveting or bolting would be satisfactory.

Positioned internally of the housing compartment is a centrally located spindle drum 80 composed of a plurality of rows of picking spindle mechanism which are spaced apart vertically on the order of the spacing of the grid bars 44 so as to permit spindles 81 to pass between them. The spindles move in an orbit about the axis of the drum 80 and when in the passage 14 move from front to rear in the orbit. The spindles 81 rotate on their axes and upon their being positioned in the stalk passage 14 operate to snag the cotton fibers and consequently to dislodge the cotton from the plants. The spindle drum 80 rotates so that the spindles 81 will move in an orbit from front to rear in the stalk passage 14 and then inwardly of the housing. The spindle drum 80 is shown in representative form and is described only generally for purposes of this invention. The drum 80 is supported on the horizontal plate 56 at its lower end and is driven by means of an upright drive shaft 83 which is driven by a suitable drive mechanism, not shown, contained in an upper housing 84 positioned above the picking units 30, 31. Likewise, drive mechanism for operating the individual spindles 81 is also provided in that housing. The exact type of drive for operating the spindles and spindle drum is for purposes of this invention unimportant but should a detailed study of the drive mechanism be desired, such may be had by reference to U.S. Patent 2,721,436, issued to Mr. A. L. Hubbard.

Provided at the outer and forward end of the picking unit 30 is an upright doffing assemblage or drum 90. The drum cooperates with the spindles for doffing the cotton bolls therefrom. As may be seen in FIG. 2, the doffing drum 90 is positioned forwardly and outwardly relative to the spindle drum 80 and adjacent the material discharge opening 53. The doffing drum 90 is composed of a plurality of vertically spaced doffing plates 91 which operate to remove the cotton from the spindles 81. The doffing mechanism 90 rotates in the direction of the arrow 92 and feeds the cotton into the inner side of the door structure and into the rear compartment 70. Due to the location of the doffing mechanism 90 relative to the spindle drum 80, the spindles 81 will move well over 180° of their orbit following their leaving the passage 14. By so placing the doffing mechanism, trash and other material accumulated on the spindles and the cotton will move a considerable distance and have a greater opportunity to depart from the cotton prior to the cotton itself being doffed into the discharge area of the picker.

Positioned at the outer and rear portion of the picker housing is a brush or cleaning drum indicated in its entirety by the reference numeral 95. In the first form of the invention, the cleaning drum 95 is composed of a plurality of vertically spaced plates 96 supported on a central shaft 97 with brushing bristles 98 extending from the upper and lower surface of the plates 96. The plates 96 are spaced vertically apart on the order of the spindles 81 and are so placed so as to permit the spindles 81 to pass between adjacent plates 96. Viewing FIG. 4, it becomes apparent that the bristles 98 do not actually contact the spindles 81 but serve only to comb through the cotton on the spindles and to generally brush the trash from the cotton. The brushing mechanism 95 will rotate in the direction of the arrow 99 and will drive the trash against the bars 51 so as to cause the trash either to pass between the bars 46 or to gravitate through the open bottom of the picker housing. The shaft 97 is supported at its lower end by the support plate 55. Similarly, the main support and drive shaft 100 of the doffing mechanism 90 is also supported at the forward end of the support plate 55. The upper end of the shafts 97, 100 are supported within the housing 84 and are provided with suitable drive means, not shown, for causing rotation thereof.

Also provided in the rear of the housing is an upright plate 105 which is positioned adjacent the outer edge of the trash discharge opening 47. The forward or inner edge of the plate 105 terminates substantially at the end of the spindles 81 and operates to peel off the trash from the spindles and also to drive the trash leaving the spindles from the centrifugal action of the drum and to permit passage of the trash rearwardly of the picking unit.

The picking unit 31 to the right of the passage 14 is generally similar to that of the left picking unit 30. The right picker housing or casing is composed of front or forward upright wall structure 120 across the forward end of the unit, and inner or passage-adjacent side structure 121 positioned adjacent the plant passage 14. The inner side 121 is composed of a plurality of fore-and-aft extending vertically spaced grid bars 122 which permits the spindles of the spindle drum to move in the passage 14. At the rear of the unit is upright and transverse wall structure composed of a plurality of vertically disposed and transversely spaced bars 124 which forms a grille 125, the latter permitting air to enter into the picker housing and trash to pass out of the housing. The upright transverse wall structure 125 has an inner terminal edge which forms with the inner wall structure 121 a trash discharge opening 123. The picker housing is further characterized by having an open-bottom structure including a fore-and-aft extending brace or support plate 126 extending from front to rear of the picker housing. The plate 126 extends forwardly of the front wall 121 and serves as a support for a pressure plate 127 which operates through the biasing effort of a spring 128 to maintain the cotton plants in contact with the spindles 81 of the picking drum 80.

Supported on the plate 126 and located generally centrally within the picker housing is a spindle drum 135 which operates upon rotation to move spindles 136 in an orbit part of which includes movement from front to rear in the stalk passage 14. The spindle drum 135 is controlled and is mounted on an upright central shaft 137, the lower end of which is journaled to the support plate 126 and the upper end of which extends in the housing 84 and receives power from the driving source of the picker. The spindles 136 move between the grid bars 122 and move the cotton picked from the plants into the picker housing.

Also supported on the support plate 126 is a forwardly positioned doffing mechanism 140 including a series of vertically spaced doffing plates spaced on the order of the spindles which operate to doff cotton from the spindles in conventional manner. The doffing mechanism 140 rotates in a counterclockwise direction as indicated by the arrow 141 so as to doff the cotton from the spindles and to move the doffed cotton forwardly and again it will be recognized that the spindles 136 will move through the greater part of their orbit between the time they leave the passage 14 and enter into an area adjacent the doffing mechanism 140. Consequently, trash which may be incidentally connected to the cotton will have ample opportunity to be dislodged from the cotton prior to its being doffed.

Also provided within the picker housing and to the rear of the spindle drum 135 is a brushing mechanism 145 which is generally identical to the brushing mechanism 95 previously described relative to the outer picking unit 30. The brushing mechanism is composed of a plurality of vertically spaced plates having bristles extending from their upper and lower surfaces which contact the cotton on the spindles 136 and operate to brush the trash from the cotton fibers. The brushing mechanism 145 is supported on a central rotatable shaft 146 which is supported at its lower end on the support plate 126 and extends upwardly and into the housing 84 from where it is driven through suitable drive mechanism. The brushing mechanism rotates in the direction of the arrow 147 and tends to drive the material against the bars 124 so that the trash will either pass through the bars 124 or will gravitate to the lower open bottom of the picker housing.

Disposed within the picker housing and adjacent the inner terminal edge of the grille structure 125 is an upright plate 150 having an inner edge terminating substantially adjacent to the ends of the spindles 136 so that waste and scrap material leaving the spindles will be guided through the trash discharge opening 123 and outward of the picker housing. A pressure plate 151 is provided on the outer picking unit 30 to press the plants against the spindles 136 of the inner picking unit 31. The pressure plate is biased toward the passage by means of a spring 152 supported on a rear extension of the support plate 56.

Referring to the inner picking unit 32 of the mechanism used to pick cotton from the right row of the two rows of cotton plants, it is identical to that of the inner picking unit 31 used to pick cotton from the left row. The picker housings for the inner picking units 31, 32 open inwardly and to one another with the housings being rigidly connected by means of bolts 155 extending through fore-and-aft angle iron members 156, 157. The rear wall structure of the picking unit 32 is a continuation of the grille structure 125. The forward wall structure 160 has an edge 161 terminating from an upright adjacent edge 162 of the wall structure 120 so as to form a boll discharge opening 163 common to both picking units 31, 32. The picking unit 32 is provided with a spindle drum 165, doffing mechanism 166, and a brushing mechanism 167 which is identical and oppositely positioned to the drum 135, doffing mechanism 140, and brushing mechanism 145. The doffing mechanisms 140, 166 which are inwardly and forwardly of their respective picking drums operate to drive cotton doffed from the spindles of the respective drums forwardly through the boll discharge opening 163.

The casing or door structure which receives cotton bolls through the discharge opening 163 is composed of an upright U-shaped panel or casing 171 with rearwardly extending legs 172, 173 having flanges 174, 175 respectively which fit adjacent to the front wall structures 160, 120 respectively. Bolts 176 are used to detachably connect the door structure 170 to the wall structures 160, 120. The U-shaped panel 171 is closed at its lower end by a lower panel 177 and at its upper end by a somewhat similar panel 178 having an opening through which an upright tubular duct section 180 projects. The duct 180 terminates at its lower edge spacedly from the lower panel 177 so that the lower edge of the duct and the panel 177 form a material receiving opening through which cotton bolls may be moved into the suction duct system. The duct section 180 has its forward surface lying adjacent to the surface of the bight portion of the panel 170. The leg portions 172, 173 are provided with perforated sections 181, 182 respectively which permits air to pass from the atmosphere into the duct 180. Consequently, air is not drawn from internally of the picking units 31, 32 for use in the duct system 180. The upper end of the duct 180 serves as a coupling and receives a duct extension 183, the upper end of which fits in the duct 26 leading to the blowers 21, 22. Extending inwardly from the edges 161, 162 of the front walls 160, 120 are upright plates 184, 185 which have inner edges positioned adjacent to doffers 166, 140 to block cotton from passing by the opening 163.

The picker will operate in the following manner. As the unit moves forwardly over the field, adjacent rows of cotton plants will pass through the stalk passages 14, 15 where the plants will be contacted first by the outer picking units 30, 33 and then by the inner picking units 31, 32. The spindles of each of the units will move through an orbit so that the spindles pass through the plants in a part of the orbit moving from front to rear within the passages 14, 15 at which time the spindles will collect the cotton from the plants. The spindles will continue in the orbit and pass to the rear of the spindle drums to the forwardly positioned doffing mechanism. In each of the picking units the cotton will be retained on the spindles well over half of their respective orbits prior to their reaching the doffing mechanisms. There will be two centrifugal actions set forth on the cotton, the first being as a result of rotation of the picking drums themselves and the second being by the individual rotation of each of the spindles. Consequently, there will be a tendency for trash and loose material to be thrown from the cotton. Since the housing for the picking units is generally open, both from the effect of the grille structure forming the wall structures of the housing and by the open bottom of the housing, the trash will have a relatively free movement from the spindles outwardly of the housing. For additional cleaning action, the brushing drums will operate against the cotton on the spindles to brush or comb from the cotton trash accumulated thereon.

The doffing mechanisms will tend to throw or discharge the cotton from the spindles forwardly to the respective doors on the outer picking units 30, 33 and to the common door or panel structure 170 on the inner picking units 31, 32. The perforated or grilled panels forming the rear compartments in the doors and common panel structure 170 will operate to feed fresh air into the suction ducts thereby preventing the contaminated air within the picker housing to be drawn into the suction ducts. Consequently there should be very little loose trash drawn into these suctions from within the picker housings.

In the modification shown in FIGS. 6 and 7, there is shown a series of vertically spaced stationary brushes 190 spaced on the order of the spindles and so positioned so as to permit the spindles to pass between the brushes. The brushes have shank portions 191 welded at 192 to the face of the upright plate 150. Bristles 193 extend upwardly and downwardly from the shank portions 191 so as to be disposed adjacent to the spindles.

The modification operates in substantially identical manner to the previous form of the invention with the exception that the brushes 190 are fixed and are not rotatably mounted on the walls of the picker housing. Generally the brushes 190 operate to project between the spindles and will either knock or brush loose bits of trash from the cotton. The picker housing being generally open at the bottom will permit the trash to gravitate and eventually fall through the open bottom of the housing. Also, due to the nature of the spindle drum, there will normally be a flow of air coming from the spindle drum which will tend to blow or drive the trash through the discharge opening 123 at the rear of the housing.

While only one modification of the invention has been shown, it should be recognized that other forms and variations will occur to those skilled in the art. Therefore, it should be understood that while the present modification and forms were shown for the purpose of completely and concisely illustrating the principles of the invention, it was not the intention to so limit or narrow the invention beyond the broad concepts set forth in the appended claims.

What is claimed is:

1. A cotton picking unit movable forwardly adjacent a row of cotton plants comprising: a main mobile frame including a laterally disposed open frame structure; an upright picking drum supported on and above the open frame structure having a plurality of horizontal rows of spindles spaced apart vertically, said spindles being operative upon movement of the drum to move in a continuous orbit, part of said orbit including movement of the spindles from front to rear through the row of cotton plants; a picker housing supported on the frame and having an inner plant-adjacent wall formed with openings to permit passage of the spindles into the cotton plants, forward wall structure forward of the drum extending outwardly from the inner wall structure and having an outer upright edge, a substantially continuous upright grille supported on the frame positioned partially rearwardly of and partially outwardly of the drum and extending from one edge adjacent the inner wall to a forward upright edge forward of the drum, the latter edge being spaced from the outer edge of the forward wall and defining therewith a boll-discharge opening; an upright and rotatable doffing mechanism having a plurality of vertically spaced apart doffing elements adapted for dislodging the cotton from the spindles; means mounting the doffing mechanism forwardly of the picking drum and adjacent the boll-discharge opening whereby the doffed cotton will pass through said opening as the mechanism is rotated; and a brush structure supported by the frame including a plurality of vertically spaced brushes disposed between the rows of spindles orbitally prior to the spindles contacting the doffing mechanism, said brushes being effective to comb the trash from the cotton prior to its being doffed.

2. A cotton picking unit movable forwardly adjacent a row of cotton plants comprising: a main mobile frame; an upright picking drum supported on the frame having a plurality of horizontal rows of spindles spaced apart vertically, said spindles being operative upon movement of the drum to move in a continuous orbit, part of said orbit including movement of the spindles from front to rear through the row of cotton plants, a picker housing supported on the frame and having an inner plant-adjacent wall formed with openings to permit passage of the spindles into the cotton plants, forward wall structure forward of the drum extending outwardly from the inner wall structure and having an outer upright edge, a substantially continuous upright grille positioned partially rearwardly of and partially outwardly of the drum and extending from one edge adjacent the inner wall to to a forward upright edge forward of the drum, the latter edge being spaced from the outer edge of the forward wall and defining therewith a boll-discharge opening; an upright and rotatable doffing mechanism having a plurality of vertically spaced apart doffing elements adapted for dislodging the cotton from the spindles; and means mounting the doffing mechanism forwardly of the picking drum and adjacent the boll-discharge opening whereby the doffed cotton will pass through said opening as the mechanism is rotated.

3. A cotton picking unit movable forwardly adjacent a row of cotton plants comprising: a main mobile frame; an upright picking drum supported on the frame having a plurality of horizontal rows of spindles spaced apart vertically, said spindles being operative upon movement of the drum to move in a continuous orbit, part of said orbit including movement of the spindles from front to rear through the row of cotton plants; a picker housing supported on the frame surrounding the drum and having a boll-discharge opening at the forward and outer portion of the housing; an upright and rotatable doffing mechanism having a plurality of vertically spaced apart doffing elements adapted for dislodging the cotton from the spindles; and means mounting the doffing mechanism forwardly of the picking drum and adjacent the boll-discharge opening whereby the doffed cotton will pass through said opening as the mechanism is rotated.

4. A cotton picking unit movable adjacent a row of cotton plants comprising: a main frame; an upright picking drum supported on the frame having a plurality of horizontal rows of spindles spaced apart vertically, said spindles being operative upon movement of the drum to move in a continuous orbit, part of said orbit including movement of the spindles through the row of cotton plants; a picker unit housing supported on the frame having a boll-discharge opening at the forward and outer portion of the housing; an upright and rotatable doffing mechanism having a plurality of vertically spaced apart doffing elements adapted for dislodging the cotton from the spindles; means mounting the doffing mechanism forwardly and outwardly of the picking drum and adjacent the boll-discharge opening whereby the doffed cotton will pass through said opening as the mechanism is rotated; and a plurality of vertically spaced elements supported on the frame and disposed between the rows of spindles orbitally prior to the spindles contacting the doffing mechanism, said elements being effective to dislodge trash from the cotton prior to its being doffed.

5. A cotton picking unit movable adjacent a row of cotton plants comprising: a main frame; an upright picking drum supported on the frame having a plurality of horizontal rows of spindles spaced apart vertically, said spindles being operative upon movement of the drum to move in a continuous orbit, part of said orbit including movement of the spindles through the row of cotton plants; a picker unit housing supported on the frame having a boll-discharge opening; an upright and rotatable doffing mechanism having a plurality of vertically spaced apart doffing elements adapted for dislodging the cotton from the spindles; means mounting the doffing mechanism on the frame adjacent the boll-discharge opening whereby the doffed cotton will pass through said opening as the mechanism is rotated; and a plurality of vertically spaced elements supported on the frame and disposed between the rows of spindles orbitally prior to the spindles contacting the doffing mechanism, said elements being effective to dislodge trash from the cotton prior to its being doffed.

6. The invention defined in claim 5 in which the housing has rear upright wall structure defining an upright trash-discharge opening rearwardly of the drum and the means mounting the elements on the frame is an upright plate extending inwardly to an inner terminal edge adjacent the drum effective to cause trash peeling off the drum to pass through the trash-discharge opening, and the vertically spaced elements are rigid with the plate and extend inwardly beyond the edge and between the spindles.

7. The invention defined in claim 5 in which the elements have bristles extending upwardly and downwardly therefrom to contact the cotton on the spindles and to brush the trash therefrom.

8. The invention defined in claim 5 in which the housing includes vertically disposed wall structure and the elements are brushes fixed to the wall structure and extending inwardly of the housing and between the spindles.

9. The invention defined in claim 5 in which the elements are a series of vertically alined and spaced apart plates rotatable about a common axis with each of the plates being disposed between a row of spindles.

10. The invention defined in claim 9 in which the plates have brushes extending from their surfaces which contact the cotton on the spindle and brush the trash therefrom.

11. A cotton picking unit movable adjacent a row of cotton plants comprising: a main frame; an upright picking drum supported on the frame having a plurality of horizontal rows of spindles spaced apart vertically, said spindles being operative upon movement of the drum to move in a continuous orbit, part of said orbit including movement of the spindles through the row of cotton plants; a picker unit housing supported on the frame having a boll-discharge opening at the forward outer portion of the housing; an upright doffing mechanism; means mounting the doffing mechanism forwardly and outwardly of the picking drum and adjacent the boll-discharge opening whereby the doffed cotton will pass through said opening as the mechanism is rotated; a door structure supported on the housing for closing the boll-discharge opening comprising upper and lower laterally disposed panels, an outer upright panel interconnecting the outer edges of the upper and lower panels and extending arcuately around the forward outer portion of the housing, an upright panel extending downwardly from the upper panel and terminating at its lower edge spacedly from the lower panel for dividing the door structure into adjoining compartments, one compartment of which is outward of and opening to the doffing mechanism via the boll-discharge opening and the other compartment of which is forward of the doffing mechanism and opening to an upper suction duct, the panels of said one compartment being generally perforate and the panels of said other compartment being generally imperforate.

12. A cotton picking unit movable adjacent a row of cotton plants comprising: a main frame; an upright picking drum supported on the frame having a plurality of horizontal rows of spindles spaced apart vertically, said spindles being operative upon movement of the drum to move in a continuous orbit, part of said orbit including movement of the spindles through the row of cotton plants; a picker unit housing supported on the frame having a boll-discharge opening at the forward outer portion of the housing; an upright doffing mechanism; means mounting the doffing mechanism forwardly and outwardly of the picking drum and adjacent the boll-discharge opening whereby the doffed cotton will pass through said opening as the mechanism is rotated; a door structure supported on the housing for closing the boll-discharge opening comprising upper and lower laterally disposed panels, an outer upright panel interconnecting the outer edges of the upper and lower panels and extending arcuately around the forward outer portion of the housing, an upright panel extending downwardly from the upper panel and terminating at its lower edge spacedly from the lower panel for dividing the door structure into adjoining compartments, one compartment of which opens to the doffing mechanism via the boll-discharge opening and the other compartment which opens to an upper suction duct, the panels of said one compartment being generally perforate and the panels of said other compartment being generally imperforate.

13. A cotton harvesting assembly comprising a main frame movable forwardly over a field of row-grown cotton plants; an upright picker housing supported on the frame and disposed between adjacent rows of cotton plants with opposite sides thereof adjacent the respective rows having vertically extending spindle openings therein, said housing having a transversely disposed upright rear wall composed of grille structure, and a transversely disposed front wall extending between said sides and having a centrally located upright cotton discharge opening therein; a pair of picking drums mounted in said housing adjacent said sides, each of the picking drums having picking spindles extending laterally therefrom through the respective spindle openings and into the respective adjacent rows of cotton plants; a pair of upright doffing mechanisms in side opposed relation supported on the frame forwardly and inwardly of the picking drums and adjacent the cotton discharge opening, said doffing mechanisms being effective to dislodge cotton from the respective picking drums and dispatch it through the discharge opening; and an upright U-shaped casing supported by the frame adjacent the discharge opening and opening rearwardly to receive cotton through the discharge opening, said casing having oppositely disposed upright panels extending forwardly from opposite edges of the discharge opening and a forward upright interconnecting panel portion between the upright panels, said casing having a forward upper portion connected to a suction type conveyor, the opposed upright panels thereof being at least partially grilled to permit flow of air through said panels into the suction type conveyor.

14. A cotton harvesting assembly comprising a main frame movable forwardly over a field of row-grown cotton plants; an upright picker housing supported on the frame and disposed between adjacent rows of cotton plants with opposite sides thereof adjacent the respective rows having vertically extending spindle openings therein, said housing having a transversely disposed front wall extending between said sides with a centrally located upright cotton discharge opening therein; a pair of picking drums mounted in said housing adjacent said sides, each of the picking drums having picking spindles extending laterally therefrom through the respective spindle openings and into the respective adjacent rows of cotton plants; a pair of upright doffing mechanisms supported on the frame forwardly and inwardly of the picking drums and adjacent the cotton discharge opening, said doffing mechanisms being effective to dislodge cotton from the respective picking drums and dispatch it through the discharge opening; and an upright U-shaped casing supported by the frame adjacent the discharge opening and opening rearwardly to receive cotton through the discharge opening, said casing having oppositely disposed upright panels extending forwardly from opposite edges of the discharge opening and a forward upright interconnecting panel portion between the upright panels, said casing having a forward upper portion connected to a suction type conveyor, the opposed upright panels thereof being at least partially grilled to permit flow of air through said panels into the suction type conveyor.

15. A cotton harvesting assembly comprising a main frame movable forwardly over a field of row-grown cotton plants; an upright picker housing supported on the frame and disposed between adjacent rows of cotton plants with opposite sides thereof adjacent the respective rows having vertically extending spindle openings therein, said housing having a transversely disposed front wall extending between said sides with a centrally located upright cotton discharge opening therein; a pair of picking drums mounted in said housing adjacent said sides, each of the picking drums having vertically spaced picking spindles extending laterally therefrom through the respective spindle openings and into the respective adjacent rows of cotton plants; a pair of upright doffing mechanisms supported on the frame forwardly and inwardly of the picking drums and adjacent the cotton discharge opening, said doffing mechanisms being effective to dislodge cotton from the respective picking drums and dispatch it through the discharge opening; and an upright U-shaped casing supported by the frame adjacent the discharge opening and opening rearwardly to receive cotton through the discharge opening, said casing having a portion thereof connected to a suction type conveyor.

16. A cotton harvesting assembly comprising a main frame movable forwardly over a field of row-grown cotton plants; an upright picker housing supported on the frame and disposed between adjacent rows of cotton plants with opposite sides thereof adjacent the respective rows having vertically extending spindle openings therein, said housing having a transversely disposed upright rear wall composed of grille structure, and a transversely disposed front wall extending between said sides with a centrally located upright cotton discharge opening therein; a pair of picking drums mounted in said housing adjacent said sides, each of the picking drums having vertically spaced picking spindles extending laterally therefrom through the respective spindle openings and into the respective adjacent rows of cotton plants; a pair of upright doffing mechanisms supported on the frame forwardly and inwardly of the picking drums and adjacent the cotton discharge opening, said doffing mechanisms being effective to dislodge cotton from the respective picking drums and dispatch it through the discharge opening; and an upright U-shaped casing supported by the frame adjacent the discharge opening and opening rearwardly to receive cotton through the discharge opening, said casing having a portion thereof connected to a suction type conveyor.

17. The invention defined in claim 15 further characterized by a plurality of laterally disposed elements supported by the frame and extending between the vertically spaced spindles, said elements being effective to dislodge trash from the cotton.

18. The invention defined in claim 17 further characterized by the elements having aggressive sides thereon for effecting a brushing action against the cotton on the spindles.

19. The invention defined in claim 15 further characterized by rearwardly projecting plates extending from the front wall of the housing and from opposite sides of the discharge opening and terminating adjacent the doffing mechanisms.

References Cited in the file of this patent

UNITED STATES PATENTS 2,803,938    Thomann    Aug. 27, 1957